United States Patent [19]

Stark et al.

[11] Patent Number: 5,309,357
[45] Date of Patent: May 3, 1994

[54] SCINTILLATION DATA COLLECTING APPARATUS AND METHOD

[75] Inventors: Iain Stark, Dollard des Ormeaux; Abel Ferreira, Pointe-Claire, both of Canada

[73] Assignee: Independent Scintillation Imaging Systems (ISIS) Inc., St-Laurent, Canada

[21] Appl. No.: 826,796

[22] Filed: Jan. 28, 1992

[51] Int. Cl.[5] .................. G01T 1/164; G06F 15/42
[52] U.S. Cl. .......................... 364/413.24; 250/369; 250/363.02
[58] Field of Search ............ 364/413.13, 413.19, 364/413.24; 250/369, 363.02

[56] References Cited

U.S. PATENT DOCUMENTS

| | | | |
|---|---|---|---|
| 4,497,024 | 1/1985 | Roth | 364/414 |
| 4,780,823 | 10/1988 | Stoub et al. | 364/413.13 |
| 4,857,722 | 8/1989 | Kumazawa et al. | 250/207 |
| 4,860,205 | 8/1989 | Jatteau | 364/413.24 |
| 4,879,464 | 11/1989 | Iinuma | 250/361 R |
| 4,881,171 | 11/1989 | Jatteau et al. | 364/413.24 |
| 4,900,931 | 2/1990 | Tornier et al. | 250/369 |

FOREIGN PATENT DOCUMENTS

| | | |
|---|---|---|
| 1280224 | 2/1991 | Canada . |
| 0450388 | 10/1991 | European Pat. Off. . |
| 0531566 | 3/1993 | European Pat. Off. . |
| 2253274 | 9/1992 | United Kingdom . |

OTHER PUBLICATIONS

Seeger, "A Fast Parallel Encoding Scheme for the Anger Camera," *IEEE Transactions On Nuclear Science*, vol. NS-31, No. 1, Feb. 1984, pp. 274-280.

*Primary Examiner*—Roy N. Envall, Jr.
*Assistant Examiner*—A. Bodendorf
*Attorney, Agent, or Firm*—Foley & Lardner

[57] ABSTRACT

A scintillation data collecting apparatus and method are provided for a scintillation camera and a data processor. The apparatus comprises a scintillation detector including an adder and an analyzer for detecting the valid scintillations, a plurality of conversion units each including an analog-to-digital converter for converting intensity signals derived from the valid scintillations into high, accuracy digital values, and controllers for controlling operation of each of the analog-to-digital converters of the conversion units. The method comprises steps of adding the intensity signals generated by the scintillation camera and which are indicative of the scintillations, and analyzing the sum of the intensity signals to determine if the detected scintillations are valid. To select only those values involved in a scintillation event for processing and free up ADCs which are uninvolved to convert future intensity signals, the intensity signals may be compared to a threshold value to allow only those ADCs whose corresponding intensity signal is above the threshold to convert, or a rapid determination of which serial ADCs are involved can be done by allowing all serial ADCs to convert, waiting for a first positive MSB from one of the ADCS, and resetting all ADCs determined to be uninvolved in the event. The converted signals derived from the intensity signals are digital value signals indicative of the valid scintillations computable by the data processor to determine spatial locations of the valid scintillations.

20 Claims, 3 Drawing Sheets

SCINTILLATION DATA COLLECTING APPARATUS AND METHOD

BACKGROUND OF THE INVENTION

1. Field of the Invention

The invention relates to a scintillation data collecting apparatus and a method therefor, to be used with a scintillation camera and a data processor, for efficiently collecting scintillation data produced by the scintillation camera and digitally converting the data for transmission to the data processor such that the latter computes and establishes spatial locations of the scintillations for forming a displayable image, or for storage.

2. Description of the Prior Art

Known in the art is U.S. Pat. No. 4,900,931 which describes a device for locating nuclear radiation and radiation image formation device incorporating such a locating device. The locating device comprises a weighting means made of an arrangement of resistors for supplying analog electrical signals indicative of the position and the energy of a radiation transduced in a scintillation detected by a plurality of photodetectors. The analog electrical signals are then digitally converted by analog-to-digital converters so that a data processor such as a computer can process the signal for determining the location of the radiation.

Since the locating of a scintillation is analogic, the scintillation location accuracy is limited and very dependent on the characteristics of the analog components (resistors). The resolution and uniformity of the locating process also suffer for the same reasons. Furthermore, such a locating device based on a weighted sum of the signals generated by the photodetectors cannot handle more than one radiation event at a time.

Also known in the art is U.S. Pat. No. 4,860,205 which describes a scintillation camera processing circuitry comprising 'p' acquisition channels individually amplifying, filtering and sampling the electrical signals generated by 'p' photodetectors detecting scintillations produced by a scintillation camera, and a processor for processing the digitally converted electrical signals and determining the location of the scintillations.

The processing of all the electrical signals produced by the photodetectors requires a huge processing power, mostly used to eliminate useless data instead of locating the scintillations with good resolution and uniformity.

Also known in the art is U.S. Pat. No. 4,881,171 which describes a scintillation camera having simplified electronic control, improving slightly the processor circuit of the U.S. Pat. No. 4,860,205 as mentioned earlier.

OBJECT OF THE INVENTION

It is therefore an object of the present invention to provide a scintillation data collecting apparatus, to be used with a scintillation camera and data processing means, which efficiently collects scintillation data.

Another object of the present invention is to provide such a scintillation data collecting apparatus which achieves a data reduction so that the data processor can process the data with the required accuracy to give improved resolution and uniformity over the entire crystal of the scintillation camera.

Another object of the invention is to provide such a scintillation data collecting apparatus which improves multiple scintillation event coincidence detection.

Still another object of the invention is to provide such a scintillation data collecting apparatus with reduced cost in electronics while maintaining quality scintillation event detections and conversions.

SUMMARY OF THE INVENTION

According to the present invention, there is provided a scintillation data collecting apparatus to be used with a scintillation camera and data processing means, the camera including a crystal in which scintillations are produced at spatial locations with given intensities as a result of radiation stimuli, and a plurality of light intensity measurement devices located over a surface of the crystal for respectively collecting light from the scintillations and generating intensity signals having given amplitudes indicative of the intensities, the scintillation data collecting apparatus comprising:

an adder for adding the intensity signals and thereby producing a sum signal, and analyzing means for carrying out a predetermined validity analysis on the sum signal and generating a resulting validity signal, the adder and the analyzing means forming a scintillation detecting means for detecting the scintillations and determining whether the scintillations are noise or valid scintillations;

a plurality of conversion units connected respectively to the light intensity measurement devices for individually converting the intensity signals into digital value signals, each of the conversion units having means for comparing the amplitude of the corresponding intensity signal with a threshold value and generating a resulting comparison signal, and an analog-to-digital converter for converting a signal derived from the corresponding intensity signal into the corresponding digital value signal; and controlling means for controlling operation of each of the analog-to-digital converters depending on value of the corresponding comparison signal and the validity signal, so that the digital value signals are generated in relationship with the valid scintillations;

whereby the digital value signals of the valid scintillations can be computed by the data processing means for determining the spatial locations of the valid scintillations.

Preferably, each of the means for comparing comprises a plurality of comparators for comparing the amplitude of the corresponding intensity signal not only to the threshold value but also to the amplitude of each of the intensity signals produced by a group of the light intensity measurement devices close to or surrounding the light intensity measurement device which produces the corresponding intensity signal, and an AND gate having inputs receiving comparison results from the comparators and an output on which the corresponding comparison signal is generated to indicate when the corresponding intensity signal is above the threshold value and has the greatest amplitude with respect to the amplitude of the compared intensity signals, whereby the controlling means operates some of the analog-to-digital converters of the conversion units connected to the group of light intensity measurement devices such that the signals derived from the intensity signals to be converted are selected from the corresponding light energy measurement devices which are nearest to the spatial locations where the valid scintillations occur, thereby achieving a data reduction.

Also according to the present invention, there is provided a scintillation data collecting method for a scintillation camera and data processing means, the camera including a crystal in which scintillations are produced at spatial locations with given intensities as a result of radiation stimuli, and a plurality of light intensity measurement devices located over a surf ace of the crystal for respectively collecting light from the scintillations and generating intensity signals having given amplitudes indicative of the intensities, the method comprising steps of:

adding the intensity signals;

carrying out a predetermined validity analysis on the sum of the intensity signals for detecting and determining whether the scintillations are noise or valid scintillations;

comparing individually the amplitudes of the intensity signals to a threshold value and generating thereby corresponding resulting comparison signals; and converting by means of converters signals derived respectively from the intensity signals depending on the corresponding comparison signals into corresponding digital value signals so that the digital values are generated in relationship with the valid scintillations;

whereby the digital value signals of the valid scintillations can be computed by the data processing means to determine the spatial locations of the valid scintillations.

Preferably, the step of comparing further comprises a step of comparing individually the amplitudes of the intensity signals to the amplitude of each of the intensity signals produced by a group of the light intensity measurement devices close to or surrounding the light intensity measurement device which produces the intensity signal to compare for indicating when the intensity signal to compare is above the threshold value and has the greatest amplitude with respect to the amplitude of the compared intensity signals; and the step of converting further comprises a step of converting some of signals derived respectively from the intensity signals originating from the group of the light intensity measurement devices into the corresponding digital value signals;

whereby the signals derived from the intensity signals to be converted are selected from the corresponding light intensity measurement devices which are nearest to the spatial locations where the valid scintillations occur.

The invention further provides an apparatus to be used with a scintillation camera and data processing means, the camera including a crystal in which scintillations are produced at spatial locations with given intensities as a result of radiation stimuli, and a plurality of light intensity measurement devices located over a surface of the crystal for respectively collecting light from the scintillations and generating intensity signals having given amplitudes indicative of the intensities, the scintillation data collecting apparatus comprising:

an adder for adding the intensity signals and thereby producing a sum signal, and analyzing means for carrying out a predetermined validity analysis on the sum signal and generating a resulting validity signal, the adder and the analyzing means forming a scintillation detecting means for detecting the scintillations and determining whether the scintillations are noise or valid scintillations;

a plurality of conversion units connected respectively to the light intensity measurement devices for individually converting the intensity signals into digital value signals, each of the conversion units comprising a serial analog-to-digital converter whose output gives a most-significant bit first and a least-significant bit last and means for triggering the serial converter when the validity signal indicates that a valid scintillation has occured;

most significant bit detector means for detecting which conversion unit is first to produce a positive bit when the validity signal indicates that a scintillation has occurred to determine which conversion unit has a large digital value signal resulting from the valid scintillation; and reset means for controlling a reset operation of some of the analog-to-digital converters which are determined to be uninvolved in receiving signal originating from light from the scintillation based on a result from the most-significant bit detector means, and for determining which of the analog-to-digital converters have the digital value signals which are to be sent to the data processing means;

whereby once a first positive bit of the analog-to-digital converters is detected and the involved converters are determined, the reset means can determine which converters have useful data and reset the uninvolved converters so that they are free to convert a future intensity signal of another valid scintillation even while the converters which are involved are still converting and producing their lesser-significant bits.

The invention also provides a method for a scintillation camera and data processing means, the camera including a crystal in which scintillations are produced at spatial locations with given intensities as a result of radiation stimuli, and a plurality of light intensity measurement devices located over a surface of the crystal for respectively collecting light from the scintillations and generating intensity signals having given amplitudes indicative of the intensities, the method comprising steps of:

adding the intensity signals;

carrying out a predetermined validity analysis on the sum of the intensity signals for detecting and determining whether the scintillations are noise or valid scintillations;

triggering conversion of serial analog-to-digital converters which are each connected to a corresponding one of the intensity signals when a valid scintillation is detected, the converters producing a digital value signal starting with a most-significant bit and ending with a least-significant bit;

detecting a first produced positive bit of the converters and determining which converters are involved in receiving signal resulting from the valid scintillation;

resetting some of the converters which are uninvolved in receiving signal from the valid scintillation; and transferring the digital value signals from the converters which are involved when conversion is complete;

whereby it is determined which converters have useful data and the uninvolved converters are free to convert intensity signals from a future valid scintillation even while the converters which are involved are still converting and producing their lesser-significant bits.

BRIEF DESCRIPTION OF THE DRAWINGS

In order to impart full understanding of the manner in which these and other objectives are attained in accordance with the present invention, preferred embodiments thereof are described hereinafter with reference to the accompanying drawings wherein.

DESCRIPTION OF PREFERRED EMBODIMENTS OF THE INVENTION

Figure 1:
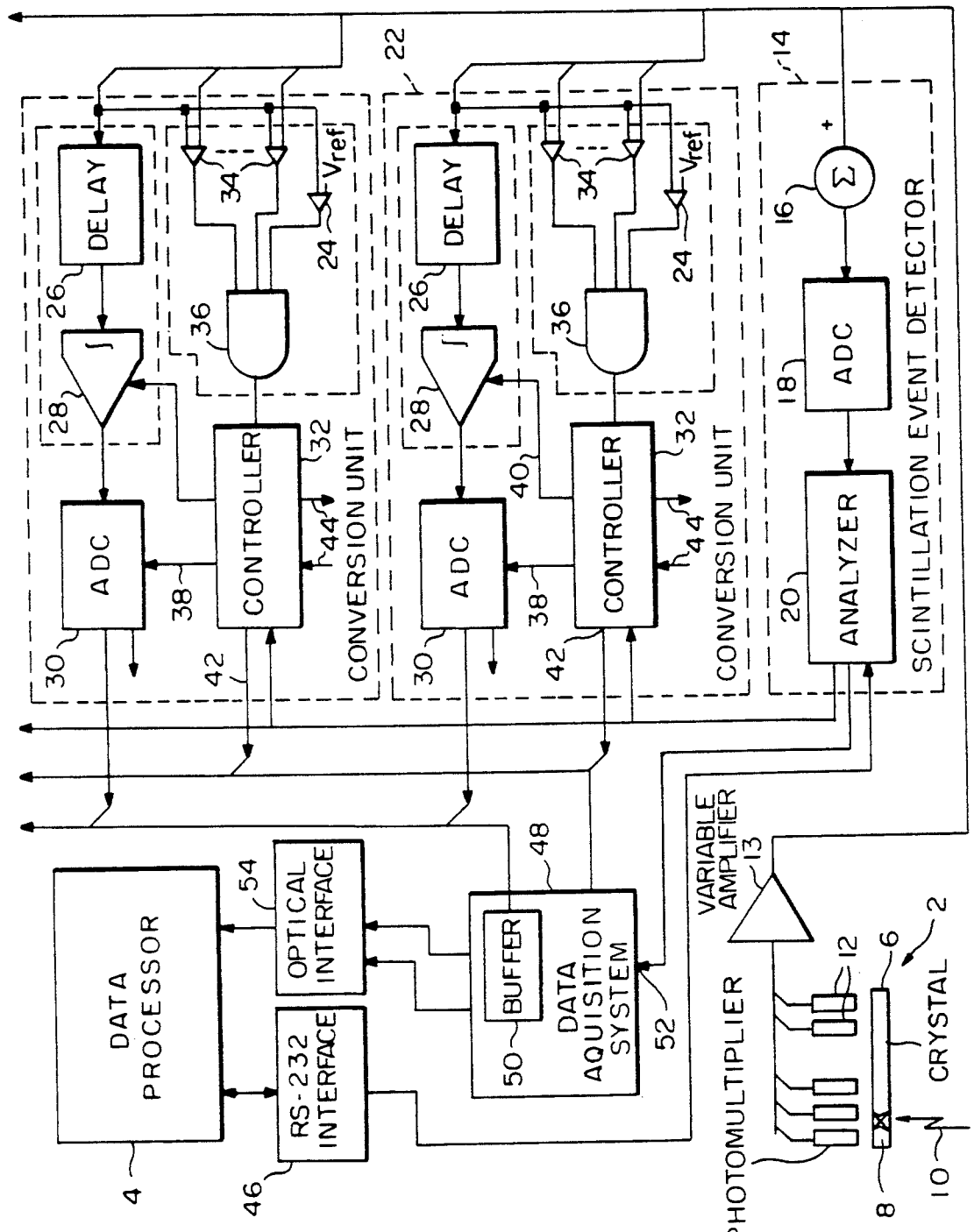
FIG. 1 is a block diagram of a scintillation data collecting apparatus according to the first preferred embodiment of the present invention.

Referring now to FIG. 1, a scintillation data collecting apparatus is provided for efficiently collecting scintillation data produced by a scintillation camera 2, and transmitting the data in a digital form to a data processor 4, such as a computer, which can process the digital scintillation data and determine thereby spatial locations of the scintillations. The application of such a scintillation data collecting apparatus enables reduction of scintillation data by sorting and digitizing with high precision the useful scintillations to provide scintillation data within the capacity of the data processor at high data rates. The data processor 4 can then compute an analytical function of the scintillation data according to the spatial locations of the scintillations, to be dependant on the location where the scintillation had occurred in order to optimize both resolution and uniformity over the entire crystal, and compute the locations of the scintillations.

The scintillation camera 2, of conventional type, has a crystal 6 for example of thallium-activated sodium iodine in which, scintillations 8 are produced at spatial locations with given intensities respectively as a result of radiation stimuli, for instance gamma-rays 10 emitted from an isotope ingested by a patient. Any conventional collimator can be interposed between the crystal 6 and the radiation field for the purpose of passing mostly only the gamma-rays which originate from a specific radiation field. Depending upon such factors as the energy of a radiation stimulus and the crystal 6 thickness, an interaction between the stimulus and the lattice structure of the crystal 6 may occur generating a pinpoint of light, i.e. a scintillation 8, propagated omnidirectionally. An array of photomultipliers 12 having photocathodes acting as light intensity measurement devices are located over the surface of the crystal 6 opposite the collimator with their optical axes perpendicular thereto to collect the light emitted from the scintillations 8 and generate respectively intensity signals having given amplitudes indicative of the intensity of the scintillations 8. Such an array of photomultipliers 12 are normally arranged in an hexagonal packed pattern.

Such a scintillation camera can be used to image the distribution density of radiation fields, for example, in medicine where the fields are created in patients by the injection or introduction of a radioactive pharmaceutical. The resultant image can yield significant medical information of value in the study, testing and treatment of a patient.

The scintillation data collecting apparatus comprises a scintillation detector 14 which detects the scintillations 8 produced in the crystal 6 and determines whether the scintillations 8 are noise or valid scintillations. The scintillation detector 14 includes an adder 16 which sums the intensity signals produced by all of the photomultipliers 12. The resulting summed intensity signals are digitally converted with a flash analog-to-digital converter 18 which can convert at high speed (for example 25 MHz) with an average accuracy (for example 8 bits). An analyzer 20, which may be formed for example by application specific integrated circuit (ASIC) controllers, then carries out a predetermined validity analysis on the digitalized summed intensity signals to determine whether the detected scintillations 8 are noise or valid scintillations created by gamma rays of the frequency emitted by the given isotope or isotopes, and in the latter case, determines how many valid scintillations have took simultaneously place.

The scintillation data collecting apparatus also comprises a plurality of conversion units 22, each associated with a different photomultiplier 12 to digitally convert the corresponding intensity signal produced therefrom, assuming the conditions that at least one valid scintillation has been detected and that the corresponding intensity signal itself is over a threshold value, in a way to eliminate useless scintillation data. Each conversion unit 22 includes a comparator for comparing the amplitude of the corresponding intensity signal to a threshold value and generating a resulting comparison signal allowing conversion of the corresponding intensity signal only if the amplitude of the latter is above the threshold value. How to reduce further useless scintillation data will be described further herein.

Each conversion unit also comprises preferably a delay 26 followed by an integrator 28 for delaying and integrating the corresponding intensity signal, thereby producing an energy signal at the output of the integrator 28. The main reason to do so is that since the intensity signal is almost a pulse which last for a very short time, it is easier to work with the energy rather than with the amplitude of the intensity signal. The delay 26 delays the pulse of the intensity signal prior to the integrator 28 to give enough time to the scintillation detector 14, the controller 32 and other components to achieve their tasks for handling properly the incoming intensity signal. A baseline restorer prior the integrator 28 may also be provided for suppressing a useless DC component of the intensity signal before the integration. A slower higher accuracy parallel analog-to-digital converter 30 (e.g. a 12 bit, 333 kHz SP7800 from Sipex of Billorica, Mass. 01821) is also included in the conversion unit 22 for converting, depending on the comparison signal, the energy signal produced by the integrator 28 into a corresponding digital energy value signal. A controller 32, which may be formed by two controlling programmable logic arrays (PLA), in each conversion unit 22 controls operation of the analog-digital converter 30 depending on the value of the comparison signal and the validity signal generated by the analyzer 20, so that conversion is done only when a scintillation is valid and that the intensity signal is over the threshold value. Each controller 32 could be also put together externally in one controller connected to each of the conversion units 22.

Amplifiers 13 having gains that can be adjusted may be provided in order to compensate for the photomultipliers 12, any other amplifiers in the circuit and analog-to-digital converters 30 variations for circuit calibration.

Therefore, only the scintillation data indicative of the largest intensity signals within a desired range are provided to the data processor 4, which can further select only some of these useful data in the calculations. This eliminates scintillation data derived from photomultipliers 12 that are distant from the scintillations, which information tends to degrade the intrinsic resolution and count-rate performance of the scintillation camera 2. In addition, the data reduction enables the data processor 4 to be simplified if needed.

Simultaneous scintillations in time can be handled by the scintillation data collecting apparatus without performance reduction, provided that the scintillations take place at different locations in the crystal 6. This is so because the analyzer 20 can analyze several scintillations and the controllers 32 can operate with two sets of control signals to control the integrators 28 and the analog-to-digital converters 30. Furthermore, the pipeline of the amplification, integration and analog-to-digital conversion allows for the simultaneous integration of the scintillation data and the conversion of the previous ones, greatly increasing the throughput of the apparatus.

In a second embodiment of the apparatus which includes a preferred addition to the data reduction performed by the apparatus described so far, each conversion unit 22 is further provided with a plurality of comparators 34 for comparing also the amplitude of the corresponding intensity signal to each of the intensity signals produced by a group of photomultipliers 12 close to or surrounding the photomultiplier 12 which produces the corresponding intensity signal in question. An AND-gate 36 receives comparison results from the comparators 34 and the comparator 24 and generates the comparison signal such that it indicates when the corresponding intensity signal in question is above the threshold value and has the greatest amplitude with respect to the amplitude of the compared intensity signals resulting from the photomultipliers 12 close to or surrounding the photomultiplier 12 in question. The controller 32 thereby operates the corresponding analog-to-digital converter 30 and some of the analog-to-digital converters 30 of the conversion units 22 connected to the group of photomultipliers 12 such that the energy signals to be converted are selected from the photomultipliers 12 which are the nearest to the spatial locations where the valid scintillations occur.

Therefore, each controller 32 has a first input 34 receiving the comparison signal, a second input 36 receiving the validity signal, a first output 38 on which a control signal is produced for controlling the operation of the connected analog-to-digital converter 30, a second output on which a second control signal is produced for controlling the operation of the connected integrator, a third output on which a signal indicative of the activity of the controller is produced, and interconnecting means 44 to some of the controllers 32 of the conversion units 22 which are connected to the group of the photomultipliers 12 surrounding or close to the photomultiplier 12 in question for giving commands for conversion to these controllers 32.

Since different isotopes of gamma-rays may be used, a serial interface 46 is provided to the apparatus for communication from the data processor 4 to the analyzer 20, by which parameters relative to the predetermined validity analysis can be modified accordingly. A RS-232 interface can be used for this purpose.

From now on, the scintillation data collecting apparatus performs an efficient data reduction, letting the data processor 4 handle all the acquisition operations such as sorting and buffering the data.

In a third embodiment of the scintillation data collecting apparatus which involves again a preferred addition to two first embodiments, a data acquisition system 48 is further provided, the latter having buffers 50 for collecting and buffering the digital value signals, an input 52 for receiving a signal indicative of a number of detected scintillations from the analyzer 20, and an encoder for encoding the digital value signals in relationship with the photomultipliers 12 which have produced them, and finally for transmitting the resulting encoded signals to the data processor 4 preferably via an optical data transmission interface 54, for example based on an AND TAXI (trademark) chip.

Figure 2:
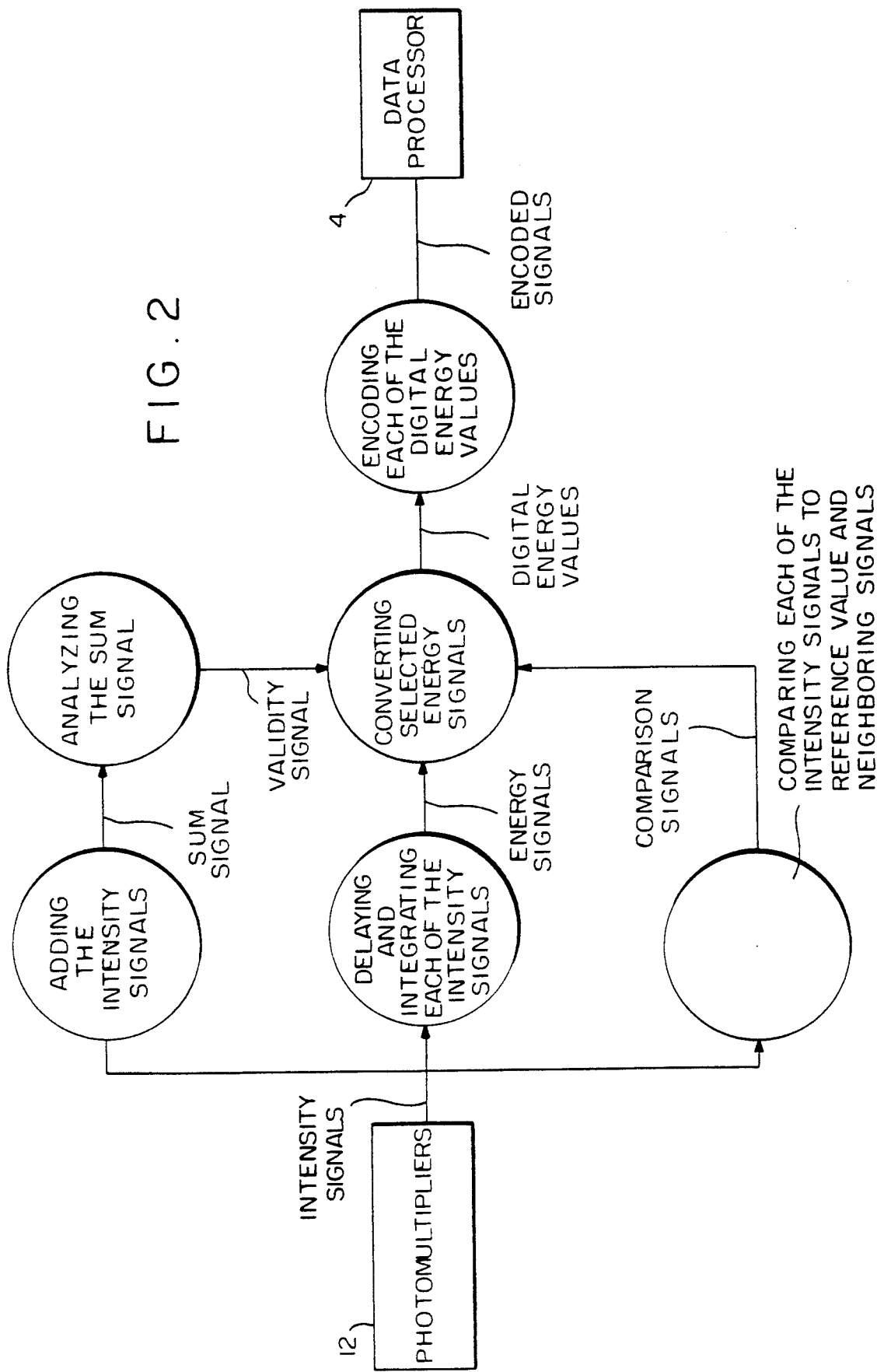
FIG. 2 is a bubble diagram of a scintillation data collecting method according to the first preferred embodiment.

Referring now to FIG. 2, a particular scintillation data collecting method is applied to collect the scintillation data produced by the photomultipliers 12 of the scintillation camera 2 (shown in FIG. 1) and transmit the scintillation data in a digital form to the data processor 4 which can process the digital scintillation data and thereby calculate spatial locations of the scintillations.

The method comprises steps of adding the intensity signals generated by the photomultipliers 12 and then carrying out a predetermined validity analysis on the summed intensity signals for detecting and determining whether the scintillations are noise or valid scintillations. Such a validity analysis can be carried out by determining if the scintillations fit in a preselected window of energy. This preliminary and approximate selection can be done by comparing the rise time of the energy signal derived from the summed intensity signals with the expected rise time for signals inside the window of energy. In case the scintillations are inside the acceptable range, integration of the intensity signals is started until the end of the pulsed energy signal. Determination if the scintillations are valid is made by comparing the energy of the scintillations with the defined window. If the scintillations are valid, the integration is stopped to let digital conversion take place. Otherwise, the integration is also stopped but the integrated signals are reset to zero for the next scintillations to process.

The method comprises also a step of comparing individually the amplitudes of the intensity signal to a threshold value such that resulting comparison signals indicate if the compared intensity signals are over the threshold value. In that case, these intensity signals, which may be meanwhile integrated for the above-described reason, are converted by means of converters 30 (shown in FIG. 1) into corresponding digital value signals indicative of the valid scintillations. The digital value signals generated are then computed by the data processor 4 to determine the spatial locations of valid scintillations.

The data processor 4 can calculate coordinates of a scintillation by providing for an analytical function of the output of the photomultipliers 12 to be dependant on the location of the scintillation. The analytical function can be carried out entirely by logical analysis of the relative magnitude of the light intensity or signal derived thereof of the photomultipliers 12. The process of calculating the locations of the scintillations may be achieved in many ways, for instance by a digital centroid method or a maximum likelihood. Both ways allow dynamic corrections for errors particular to a section of the array of photomultipliers 12 while processing the scintillation data. In this way gain misadjustments in each photomultiplier 12 can be compensated for by the data processor 4.

To achieve an efficient data reduction, the step of comparing is further characterized by comparing also the amplitudes of the corresponding intensity signal to the amplitudes of each of the intensity signals produced by a group of photomultipliers 12 close to or surrounding the photomultipliers 12 which produce the compared intensity signal for indicating when the latter is not only above the threshold value but has also the greatest amplitude with respect to the amplitude of the other compared intensity signals. The step of converting is also characterized by not only converting the corresponding intensity signal or integrated intensity signal but also converting the other signals originating from the photomultipliers 12 which are surrounding or close to the photomultiplier in question. In this way, it is possible to get the scintillation data which are produced by the photomultipliers 12 that are the nearest to the spatial locations where the valid scintillations occur, and thereby to collect efficiently only the signals needed to perform the computation of the spatial locations of the scintillations.

A step of delaying the intensity signals prior to a step of integrating these intensity signals gives time to carry out the operations for handling properly the intensity signals.

By integrating each of the intensity signals, some sort of pipelining can be done, increasing the throughput of the apparatus.

To improve further the method, other steps may be added as determining which of the converters 30 (shown in FIG. 1) are converting and therefore the corresponding photomultipliers 12 associated therewith in order to read for the acquisition of the digital values to be buffered in relationship with the photomultipliers 12 while the digital conversion is in process. This can be done by setting an order in which these digital values will be buffered, reading them into a buffer 50 (shown in FIG. 1) the digital values in the determined order whenever the last conversion takes place, and then encoding the buffered digital values in relationship with the photomultipliers which have produced them and transmitting the resulting encoded signals to the data processor 4, such that the latter has simply to perform the computation with the scintillation data without having any sort of other processes to carry out in order to locate the scintillations. Such a task may be carried out by the analyzer 20 (shown in FIG. 1) by generating control signals to govern the integration, conversion, reading of the buffers and determination of the active photomultipliers 2, for controlling the conversion units 22 (shown in FIG. 1).

Figure 3:
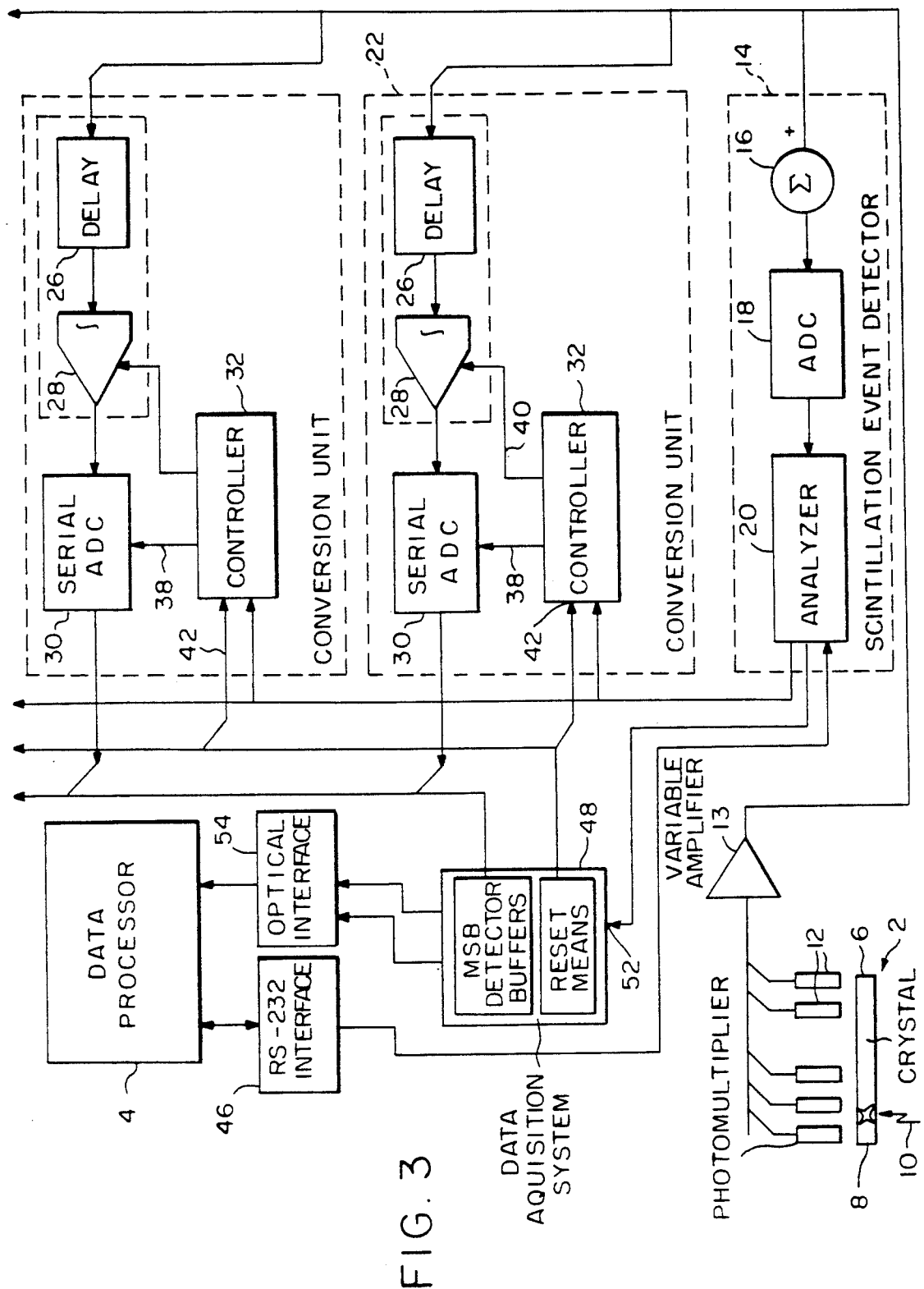
FIG. 3 is a block diagram of a scintillation data collecting apparatus according to the fourth preferred embodiment.

In the fourth preferred embodiment shown in FIG. 3, the validity signal from analyzer 20 is fed directly into the trigger inputs of the ADCs 30, and no comparator 24, AND gates 36 or controllers 32 are used. Instead, all ADCs 30 one serial ADCs and begin converting when the validity signal is received, and the data acquisition system 48 includes a first positive most-significant bit (MSB) detector. The first positive MSB means the first positive bit produced by the serial ADCs which produce bits in order from the MSB to the LSB. When the system 48 detects the first positive MSB from the ADCs 30, its logic knows which ADC has a signal which is among the largest, i.e. near the center of the scintillation event 8. Since data from at least three to usually up to seven tubes 12 will be used to calculate the position of the event 8, the system 48 selects a number of the ADCs 30 which are involved in the event 8 (they correspond to tubes 12 receiving light from the event 8) and allows them to continue to convert, while the remaining uninvolved Ams 30 are immediately reset. The reset uninvolved ADCs 30 are free to convert intensity signals resulting from a future event 8 which arrives even while the involved ADCs 30 are converting. When the involved ADCs 30 have finished converting, the system 48 sends their digital value signals via the optical interface 54 to the data processor 4, as in the other embodiments.

In the fourth embodiment, slower and more accurate serial ADCs 30 are used (e.g. [Burr Brown PCM 78P, 16-BIT, 250 kHz]) to provide an early indication of which ADC 30 corresponds to a tube 12 near the center of the event 8, and to allow for early selection of involved ADCs 30 and resetting of uninvolved ADCs 30 by system 48. System 48 acts as MSB detector means as well as reset means. In this way, the apparatus is able to collect data from parts of the crystal 2 where an event 8 has not occured within the time frame of conversion of the serial ADCs 30 (i.e. $\sim 4~\mu s$). Since the uninvolved tubes are reset after about 6% to about 20% of the time frame of conversion of the slow ADCs 30, the arrangement shown in FIG. 3 increases the countrate of the apparatus. If no positive bit is received after a predetermined number of bits are received from the ADCs 30, such as the first 3 bits, then the system 48 can be set to automatically reset all remaining uninvolved ADCs 30. This situation arises when a valid event 8 is detected by analyzer 20 and this event 8 is located where a previous event 8 just occured and the associated ADCs 30 are involved in conversion. Thus the remaining uninvolved ADCs 30 will indicate noise data and not generate a positive bit in the first 3 bits. The apparatus will be busy during this short period and then be ready to receive the next event 8.

Although, the present invention has been explained herein above by way of preferred embodiments thereof, it is to be understood that they are not intended to limit the scope of the present invention as defined in the appended claims.

We claim:

1. A scintillation data collecting apparatus to be used with a scintillation camera and data processing means, said camera including a crystal in which scintillations are produced at spatial locations with given intensities as a result of radiation stimuli, and a plurality of light intensity measurement devices located over a surface of said crystal for respectively collecting light from said scintillations and generating intensity signals having given amplitudes indicative of said intensities, said scintillation data collecting apparatus comprising:

an adder for adding said intensity signals and thereby producing a sum signal, and analyzing means for carrying out a predetermined validity analysis on said sum signal and generating a resulting validity signal, said adder and said analyzing means forming a scintillation detecting means for detecting said scintillations and determining whether said scintillations are noise or valid scintillations;

a plurality of conversion units connected respectively to said light intensity measurement devices for individually converting said intensity signals into digital value signals, each of said conversion units having means for comparing the amplitude of the corresponding intensity signal with a threshold value and generating a resulting comparison signal, and an analog-to-digital converter for converting a signal derived from the corresponding intensity signal into the corresponding digital value signal; and controlling means for controlling operation of each of said analog-to-digital converters depending on value of the corresponding comparison signal and said validity signal, so that said digital value signals are generated in relationship with said valid scintillations;

whereby said digital value signals of said valid scintillations can be computed by said data processing means for determining the spatial locations of said valid scintillations.

2. Apparatus according to claim 1, wherein each of the means for comparing comprises a plurality of comparators for comparing the amplitude of the corresponding intensity signal respectively to said threshold value and to the amplitude of each of the intensity signals produced by a group of the light intensity measurement devices close to or surrounding the light intensity measurement device which produces said corresponding intensity signal, and an AND gate having inputs receiving comparison results from said comparators and an output on which the corresponding comparison signal is generated to indicate when said corresponding intensity signal is above said threshold value and has the greatest amplitude with respect to the amplitude of the compared intensity signals, whereby said controlling means operates some of the analog-to-digital converters of the conversion units connected to said group of light intensity measurement devices such that the signals derived from the intensity signals to be converted are selected from the corresponding light energy measurement devices which are nearest to the spatial locations where said valid scintillations occur.

3. Apparatus according to claim 1, wherein each of said conversion units further comprises a controlling unit having a first input receiving the corresponding comparison signal, a second input receiving said validity signal, and an output on which a control signal is produced for controlling the operation of the corresponding analog-to-digital converter, all the controlling units forming said controlling means.

4. Apparatus according to claim 2, wherein each of said conversion units further comprises a controlling unit having a first input receiving the corresponding comparison signal, a second input receiving said validity signal, an output on which a control signal is produced for controlling the operation of the corresponding analog-to-digital converter, and interconnecting means to some of the controlling units of the conversion units which are connected to said group of the light intensity measurement devices for giving commands for conversion to said some of the controlling units, all the controlling units forming said controlling means.

5. Apparatus according to claim 4, wherein:

each of said conversion units further have sample and hold means including a delay means for delaying the corresponding intensity signal, and an integrator for integrating the corresponding delayed intensity signal and thereby generating a corresponding energy signal forming said signal derived from the corresponding intensity signal; and each of said controlling unit having a second output on which a second control signal is produced for controlling operation of the corresponding integrator, and a third output on which a signal indicative of operation of said controlling unit is produced.

6. Apparatus according to claim 2, wherein said scintillation detecting means further comprise an analog-to-digital converter coupled between said adder and said analyzing means for converting said sum signal into a digital sum signal such that said predetermined validity analysis is digitally carried out by said analyzing means.

7. Apparatus according to claim 2, further comprising a serial interface for communication from said data processing means to said analyzing means, whereby parameters relative to said predetermined validity analysis can be modified.

8. Apparatus according to claim 2, further comprising:

an optical data transmission interface, and a data acquisition system having buffers for collecting and buffering said digital value signals, an input for receiving a signal indicative of a number of valid scintillations, and an encoder for encoding said digital value signals in relationship with the light intensity measurement devices from which said digital value signals are derived and for transmitting resulting encoded signals to said data processing means via said optical data transmission interface;

and wherein:

said analyzing means further comprise an output on which said signal indicative of a number of valid scintillations is produced.

9. Apparatus according to claim 5, further comprising:

a serial interface for communication from said data processing means to said analyzing means, whereby parameters relative to said predetermined validity analysis can be modified; and an optical data transmission interface, and a data acquisition system having buffers for collecting and buffering said digital value signals, an input for receiving a signal indicative of a number of valid scintillations, and an encoder for encoding said digital value signals in relationship with the light intensity measurement devices from which said digital value signals are derived and for transmitting resulting encoded signals to said data processing means via said optical data transmission interface;

and wherein:

said scintillation detecting means further comprise an analog-to-digital converter coupled between said adder and said analyzing means for converting said sum signal into a digital sum signal such that said predetermined validity analysis is digitally carried out by said analyzing means; and said analyzing means further comprise an output on which said signal indicative of a number of valid scintillations is produced.

10. A scintillation data collecting method for a scintillation camera and data processing means, said camera including a crystal in which scintillations are produced at spatial locations with given intensities as a result of radiation stimuli, and a plurality of light intensity measurement devices located over a surface of said crystal for respectively collecting light from said scintillations and generating intensity signals having given amplitudes indicative of said intensities, said method comprising steps of:

adding said intensity signals;

carrying out a predetermined validity analysis on the sum of said intensity signals for detecting and determining whether said scintillations are noise or valid scintillations;

comparing individually the amplitudes of said intensity signals to a threshold value and generating thereby corresponding resulting comparison signals; and converting by means of converters signals derived respectively from the intensity signals depending on the corresponding comparison signals into corresponding digital value signals so that said digital values are generated in relationship with said valid scintillations; whereby said digital value signals of said valid scintillations can be computed by said data processing means to determine the spatial locations of said valid scintillations.

11. Method according to claim 10, wherein:

said step of comparing further comprises a step of comparing individually the amplitudes of said intensity signals to the amplitude of each of the intensity signals produced by a group of the light intensity measurement devices close to or surrounding the light intensity measurement device which produces the intensity signal to compare for indicating when the intensity signal to compare is above said threshold value and has the greatest amplitude with respect to the amplitude of the compared intensity signals; and said step of converting further comprises a step of converting some of signals derived respectively from the intensity signals originating from said group of the light intensity measurement devices into the corresponding digital value signals;

whereby the signals derived from the intensity signals to be converted are selected from the corresponding light intensity measurement devices which are nearest to the spatial locations where said valid scintillations occur.

12. Method according to claim 11, further comprising a step of delaying and integrating each of said intensity signals for generating thereby corresponding energy signals forming said signals derived respectively from the intensity signals.

13. Method according to claim 11, further comprising steps of:

determining which of the converters are converting and the corresponding light intensity measurement devices associated therewith;

setting an order in which the digital value signals are to be buffered in relationship with the determined light intensity measurement devices;

reading into a buffer said digital values in said order;

encoding the buffered digital values in relationship with the determined light intensity measurement devices; and transmitting resulting encoded signals to said data processing means.

14. A scintillation data collecting apparatus to be used with a scintillation camera and data processing means, said camera including a crystal in which scintillations are produced at spatial locations with given intensities as a result of radiation stimuli, and a plurality of light intensity measurement devices located over a surface of said crystal for respectively collecting light from said scintillations and generating intensity signals having given amplitudes indicative of said intensities, said scintillation data collecting apparatus comprising:

an adder for adding said intensity signals and thereby producing a sum signal, and analyzing means for carrying out a predetermined validity analysis on said sum signal and generating a resulting validity signal, said adder and said analyzing means forming a scintillation detecting means for detecting said scintillations and determining whether said scintillations are noise or valid scintillations;

a plurality of conversion units connected respectively to said light intensity measurement devices for individually converting said intensity signals into digital value signals, each of said conversion units comprising a serial analog-to-digital converter whose output gives a most-significant bit first and a least-significant bit last and means for triggering said serial converter when said validity signal indicates that a valid scintillation has occured;

most significant bit detector means for detecting which conversion unit is first to produce a positive bit when the validity signal indicates that a scintillation has occurred to determine which conversion unit has a large digital value signal resulting from the valid scintillation; and reset means for controlling a reset operation of some of said analog-to-digital converters which are determined to be uninvolved in receiving signal originating from light from said scintillation based on a result from the most-significant bit detector means, and for determining which of said analog-to-digital converters have said digital value signals which are to be sent to said data processing means;

whereby once a first positive bit of said analog-to-digital converters is detected and the involved converters are determined, the reset means can determine which converters have useful data and reset said uninvolved converters so that they are free to convert a future intensity signal of another valid scintillation even while said converters which are involved are still converting and producing their lesser-significant bits.

15. Apparatus according to claim 14, wherein:

each of said conversion units further have sample and hold means including a delay means for delaying the corresponding intensity signal, and an integrator for integrating the corresponding delayed intensity signal and thereby generating a corresponding energy signal forming said signal derived from the corresponding intensity signal.

16. Apparatus according to claim 14, wherein said scintillation detecting means further comprise an analog-to-digital converter coupled between said adder and said analyzing means for converting said sum signal into a digital sum signal such that said predetermined validity analysis is digitally carried out by said analyzing means.

17. Apparatus according to claim 14, further comprising a serial interface for communication from said data processing means to said analyzing means, whereby parameters relative to said predetermined validity analysis can be modified.

18. Apparatus according to claim 14, further comprising:

an optical data transmission interface, and a data acquisition system having buffers for collecting and buffering said digital value signals, an input for receiving a signal indicative of a number of valid scintillations, and an encoder for encoding said digital value signals in relationship with the light intensity measurement devices from which said digital value signals are derived and for transmitting resulting encoded signals to said data processing means via said optical data transmission interface;

and wherein:

said analyzing means further comprise an output on which said signal indicative of a number of valid scintillations is produced.

19. A scintillation data collecting method for a scintillation camera and data processing means, said camera including a crystal in which scintillations are produced at spatial locations with given intensities as a result of radiation stimuli, and a plurality of light intensity measurement devices located over a surface of said crystal for respectively collecting light from said scintillations and generating intensity signals having given amplitudes indicative of said intensities, said method comprising steps adding said intensity signals;

carrying out a predetermined validity analysis on the sum of said intensity signals for detecting and determining whether said scintillations are noise or valid scintillations;

triggering conversion of serial analog-to-digital converters which are each connected to a corresponding one of said intensity signals when a valid scintillation is detected, said converters producing a digital value signal starting with a most-significant bit and ending with a least-significant bit;

detecting a first produced positive bit of said converters and determining which converters are involved in receiving signal resulting from said valid scintillation;

resetting some of said converters which are uninvolved in receiving signal from said valid scintillation; and transferring said digital value signals from said converters which are involved when conversion is complete;

whereby it is determined which converters have useful data and said uninvolved converters are free to convert intensity signals from a future valid scintillation even while said converters which are involved are still converting and producing their lesser-significant bits.

20. Method according to claim 19, further comprising a step of delaying and integrating each of said intensity signals for generating thereby corresponding energy signals respectively from the intensity signals.

* * * * *